United States Patent [19]

Furukawa

[11] 4,272,771
[45] Jun. 9, 1981

[54] INK JET PRINTER WITH MULTIPLE NOZZLE PRINT HEAD AND INTERLACING OR DITHER MEANS

[75] Inventor: Tatsuya Furukawa, Yokohama, Japan
[73] Assignee: Ricoh Co., Ltd., Tokyo, Japan
[21] Appl. No.: 75,999
[22] Filed: Sep. 17, 1979

[30] Foreign Application Priority Data

Sep. 25, 1978 [JP] Japan ............................. 53-116495

[51] Int. Cl.$^3$ ............................................. G01D 15/18
[52] U.S. Cl. ..................................................... 346/75
[58] Field of Search ........................................ 346/75

[56] References Cited

U.S. PATENT DOCUMENTS

| | | |
|---|---|---|
| 3,877,036 | 4/1975 | Loeffler et al. ......................... 346/75 |
| 3,959,797 | 5/1976 | Jensen ................................. 346/75 X |
| 3,992,712 | 11/1976 | Dill et al. ............................. 346/75 X |
| 4,060,804 | 11/1977 | Yamada .............................. 346/75 X |
| 4,115,788 | 9/1978 | Takano et al. ......................... 346/75 |
| 4,219,822 | 8/1980 | Paranjpe ............................... 346/75 |

Primary Examiner—George H. Miller, Jr.
Attorney, Agent, or Firm—Burgess, Ryan and Wayne

[57] ABSTRACT

When a multiple-ink-jet printer or plotter prints one array of ink dots by one printing cycle or scan, the spacing between the lowermost row or the leftmost column of one array of ink dots printed previously and the uppermost row or the rightmost column of the adjacent array of ink dots printed next becomes too wide or too short, thus leaving a blank row or column or a black line segment due to the overlapping of the ink dots. In order to overcome this problem, the outermost rows or columns of the adjacent ink dot arrays are overlapped in such a way that the ink dots printed by the previous printing cycle or scan are interlaced with the ink dots printed by the next printing cycle or scan, whereby the boundaries between the adjacent ink dot arrays may be rendered less noticeable.

6 Claims, 18 Drawing Figures

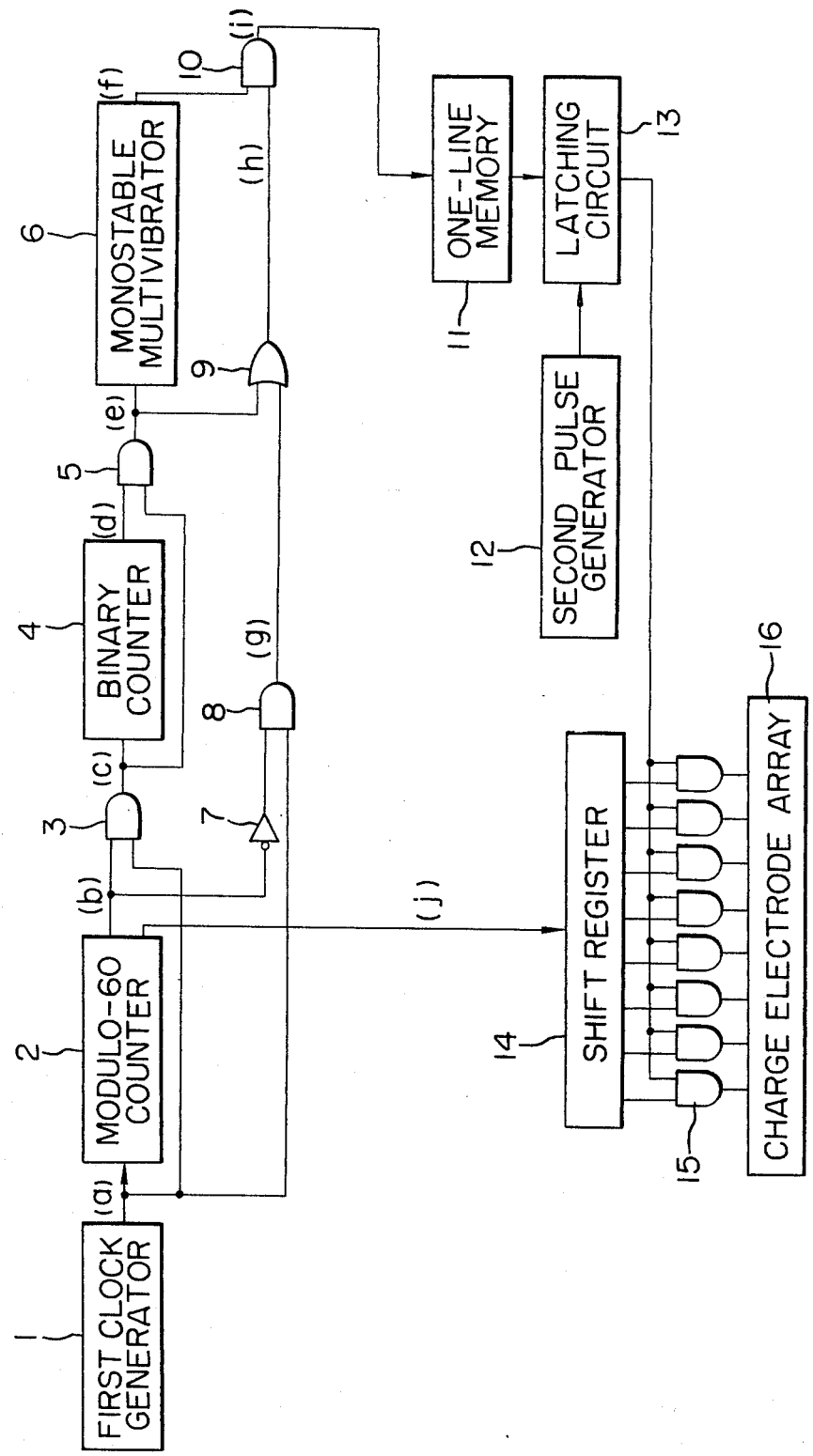

INK JET PRINTER WITH MULTIPLE NOZZLE PRINT HEAD AND INTERLACING OR DITHER MEANS

BACKGROUND OF THE INVENTION

The present invention relates to a multiple-ink-jet plotter or printer.

There have been devised and demonstrated various types of ink-jet printers or plotters. In one type, a binary or nozzle-per-spot print head or a single nozzle, electrostatic deflection type print head is mounted on a carriage which is moved relative to a recording medium. Whenever the carriage reaches either end of one printing line, the recording medium is displaced or fed by one spacing in the direction perpendicular to the movement of the carriage. In practice, the nozzles are varied in nozzle hole diameter from one to another and the pressure applied to the ink in the ink manifold or the like varies from one to another, all of the print head units must be adjusted individually so that a uniform dot spacing may be obtained. Otherwise, the spacing between the ink dots printed by the adjacent ink-jet print head units varies or the spacing between the array of ink dots printed by one stroke of the print head and the array of ink dots printed by the next stroke of the print head becomes too wide or too short, leaving a blank column or row or a black line segment due to the partial overlapping of the ink dots in the outermost columns or rows of the adjacent ink dot arrays. As a result, the overall image quality is considerably impaired. This defect is also caused by the aging of the ink which is recirculated and/or by the variations of the driving voltages applied to respective print head units.

SUMMARY OF THE INVENTION

In view of the above, the primary object of the present invention is to provide an electrostatic deflection type multiple-ink-jet plotter or printer which may render less noticeable the boundaries between the array of ink dots printed by the successive printing cycles or scans, whereby the overall image quality may be remarkably improved.

According to one aspect of the present invention, the outermost columns or rows of the adjacent ink dots are overlapped in such a way that the ink dots printed by the previous printing cycle or scan are interlaced with the ink dots printed by the next printing cycle or scan, whereby the boundary between the adjacent ink dot arrays may be rendered less noticeable, and the image quality may be considerably improved.

BRIEF DESCRIPTION OF THE DRAWINGS

FIGS. 3 and 4 are circuit diagrams of control circuits, respectively, of first and second embodiments of the present invention;

DESCRIPTION OF THE PREFERRED EMBODIMENTS

Figure 1A:
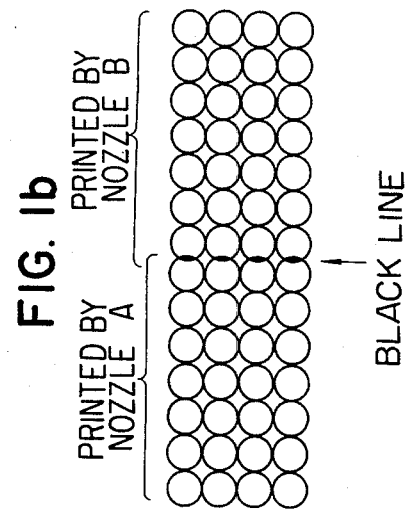
FIGS. 1a and 1b show the adjacent ink dot arrays leaving a blank column as FIG. 1a and a black line segment as FIG. 1b.
Figure 2A:
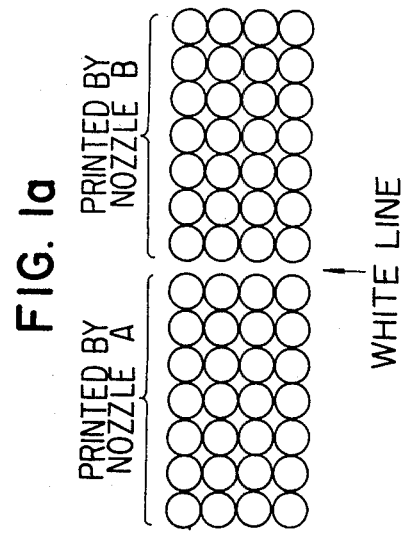
FIGS. 2a and 2b show the adjacent ink dot arrays leaving no blank column and black line segment improved by the present invention.
Figure 1B:
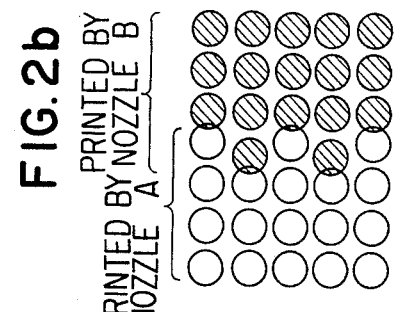
Figure 2B:
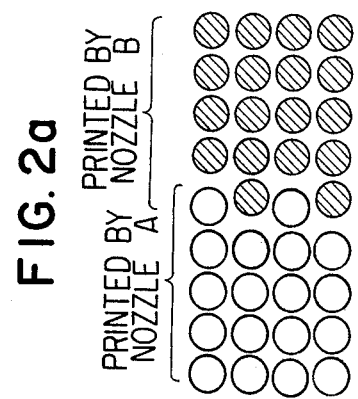

In FIGS. 1a and 1a are shown the arrays of ink dots leaving a white or blank column (FIG. 1a) and a black line segment (FIG. 1b), respectively between the arrays printed by the adjacent nozzles A and B. As shown in FIGS. 2a and 2b the boundary column between the ink dot arrays printed by the adjacent ink nozzles A and B is formed by printing the ink dots alternately by the nozzles A and B. On this occasion, in the boundary columns the inkdots printed by the nozzle A and B are partially spaced as shown at (A) or partially overlapped as shown at (B). With this scheme the boundaries between the ink dot arrays may be made less noticeable, whereby image quality may be considerably improved.

Figure 5:
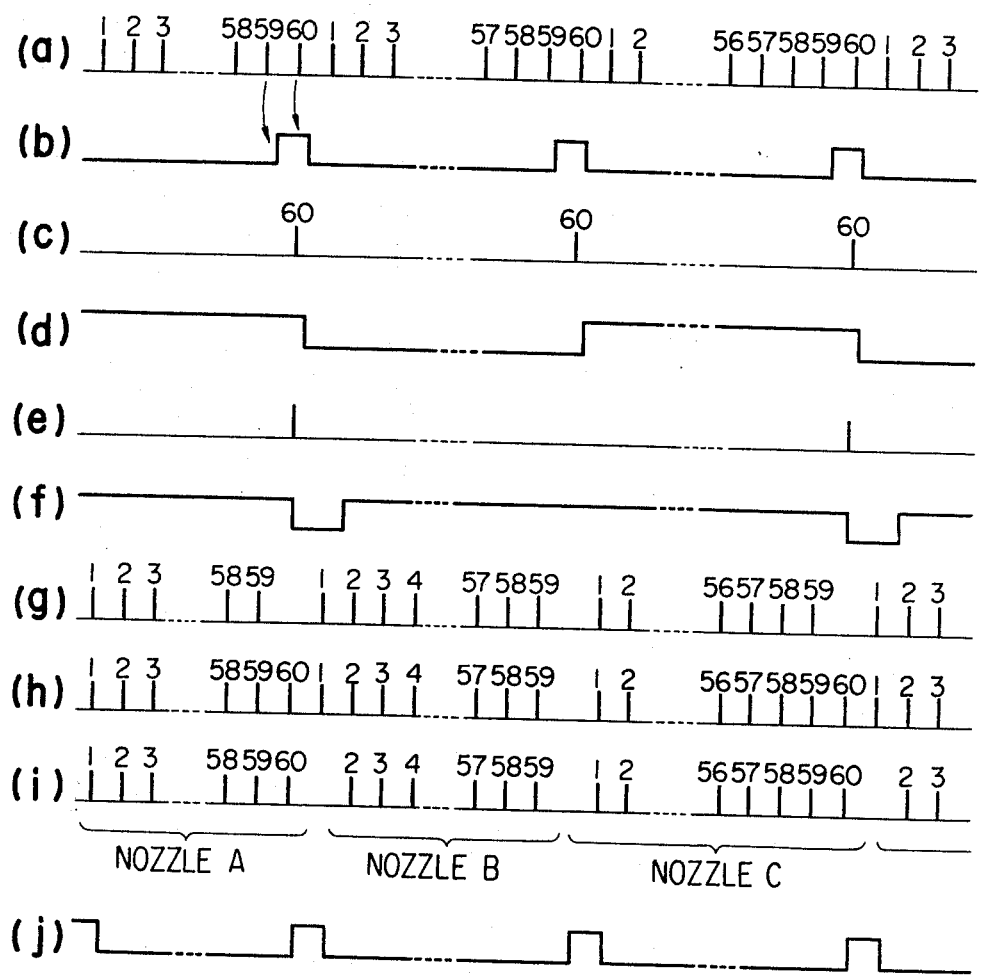
FIGS. 5 and 6 show the timing relationships among the signals present in the control circuits shown in FIGS. 3 and 4, respectively.

In FIG. 3 is shown in block diagram a control circuit for printing the boundary columns in the manner described with reference to FIG. 2. The control circuit comprises a first clock generator 1 for generating the clock pulses a, a modulo-60 counter 2, AND gates 3, 5, 8, 10 and 15, a binary counter 4, a monostable multivibrator 6, an inverter 7, an OR gate 9, a one-line memory 11, a second pulse generator 12 for generating the clock pulses B which are slightly out of synchronization with the clock pulses A, a latching circuit 13, a shift register 14 and a charge electrode array 16. Timing relationships between the signals present in the control circuit shown in FIG. 3 are shown in FIG. 5. It is desired that the charged ink drop be deflected at one of 60 discrete angles.

Referring to FIGS. 3 and 5, the first clock pulses A are applied to the modulo-60 counter 2 so that not only the output pulse (b) which rises in response to the 59-th clock pulse and falls in response to the 60-th clock pulses may be generated but also the output pulse (j) which rises in response to the 60-th clock pulse and falls in response to the first clock pulse may be generated. The AND of the signal (a) or first clock pulses A with the signal (b) by the AND gate 3 results the 60-th pulse (c) which alternately sets and resets the binary counter 4. The AND of the output signal (d) from the binary counter 4 with the 60-th pulse (c) by the AND gate 5 results the pulse (e) which appears every 120 first clock pulses (a). In response to this pulse (e), the monostable multivibrator 6 is reset so as to derive the signal (f) capable of nullifying the (60n+1)-th clock pulse A.

The output signal (b) from the modulo-60 counter 2 is also applied through the inverter 7 to the AND gate 8 to which is applied the first clock pulses (a). The output of the AND gate 8 is the clock pulse train (g) in which the 60n-th clock pulses are suppressed. The pulses (e) and the clock pulse train (g) are applied to the OR gate 9 so that the pulse train (h) may be obtained in which the first pulse series consisting 60 pulses and the second pulse series consisting of 59 pulses (the 60-th pulse being suppressed) may be generated alternately. The output (f) from the monostable multivibrator 6 and the pulse train (h) are applied to the AND gate 10 so that the (60n+1)-th pulse may be nullified. As a result, the pulse train (i) may be obtained in which a first pulse series consisting of 60 pulses and a second pulse series consisting of 58 pulses (the (60n+1)-th and the next 60n-th pulses being suppressed) alternate. The pulse train (i) is used as the clock for the one-line memory 11 so that in response to each of the clocks, the contents may be output to the latching circuit 13 and latched in response to the second clock pulses B which are slightly out of synchronism with the first clock pulses A and any of which are suppressed.

The output pulses (j) from the modulo-60 counter 2 are applied to the shift register 14 so that the output may be derived for every 60 pulses. The output from the shift register 14 and the output from the latching circuit 13 are applied to the AND gates 15, and in response to the outputs from these AND gates 15 the charge electrode array 16 is so driven as to select the nozzles.

Since the 60 pulse series and 58 pulse series alternately appear, the nozzles (in odd number) print dots as follows:

|  | Nozzle A | Nozzle B | Nozzle C | ... |
|---|---|---|---|---|
| first line | 60 dots | 58 dots | 60 dots | --- |
| second line | 58 dots | 60 dots | 58 dots | --- |
| third line | 60 dots | 58 dots | 60 dots | --- |
| . | . | . | . | . |
| . | . | . | . | . |
| . | . | . | . | . |

Thus the ink dot arrays as shown in FIG. 2 may be printed. When the number of nozzles is even, the line-end signal is applied to the binary counter 4 at the end of the line so as to reverse the state of the binary counter 4. Then the nozzles alternately print 60 and 58 dots.

Figure 4:
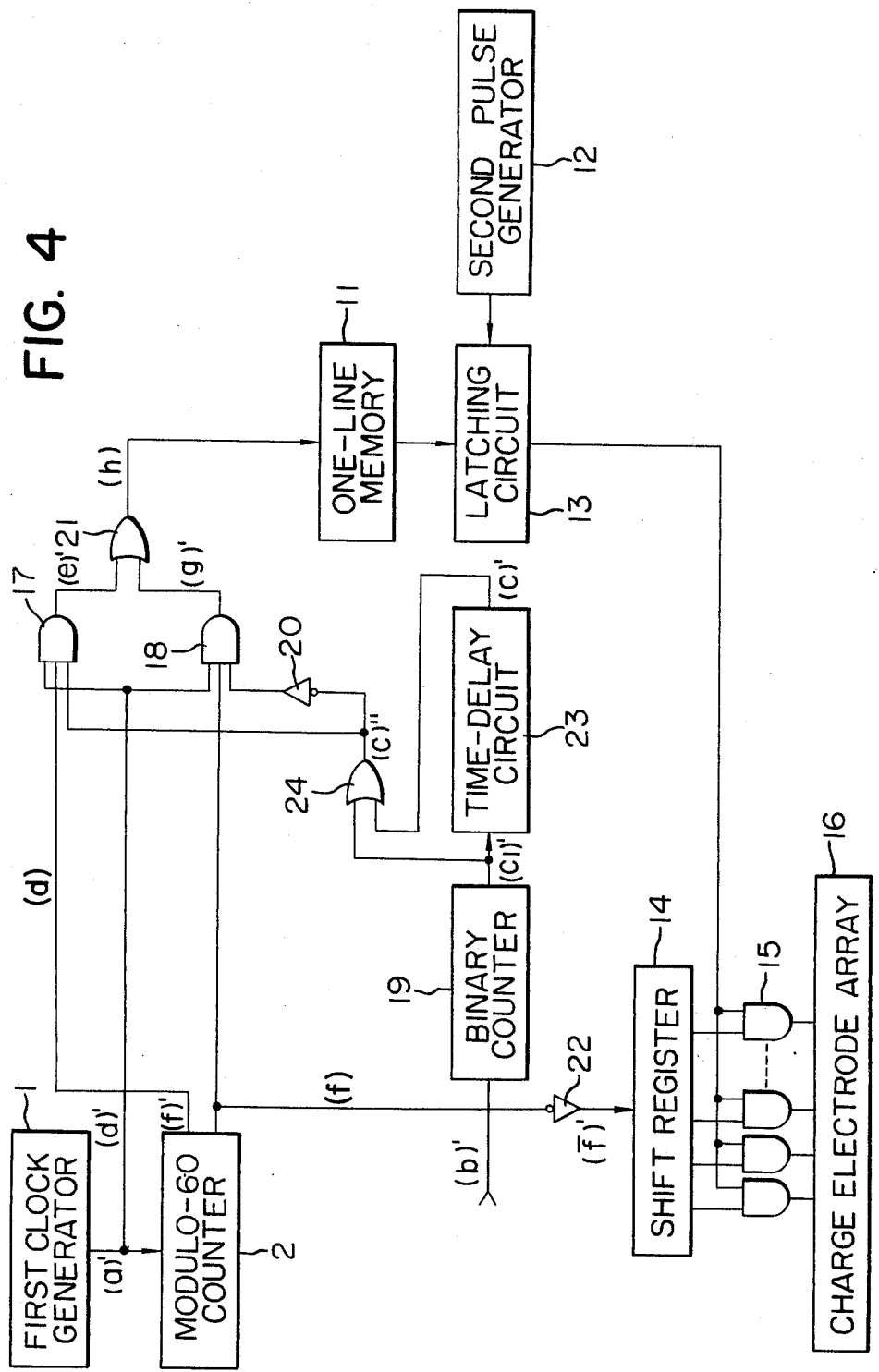

In FIG. 4 is shown a second embodiment of the present invention in which the components similar to those used in the first embodiment and shown in FIG. 3 are designated by similar numerals. In addition to the first clock pulse generator 1, the modulo-60 counter 2, the one-line memory 11, the second clock pulse generator 12, the latching circuit 13, the shift register 14, the AND gates 15 and the charge electrode array 16, the control circuit further includes AND gates 17 and 18, a binary counter 19, inverters 20 and 22, OR gates 21 and 24 and a time-delay circuit 23. Timing relationships among the signals present in the control circuit are shown in FIG. 6.

Figure 6:
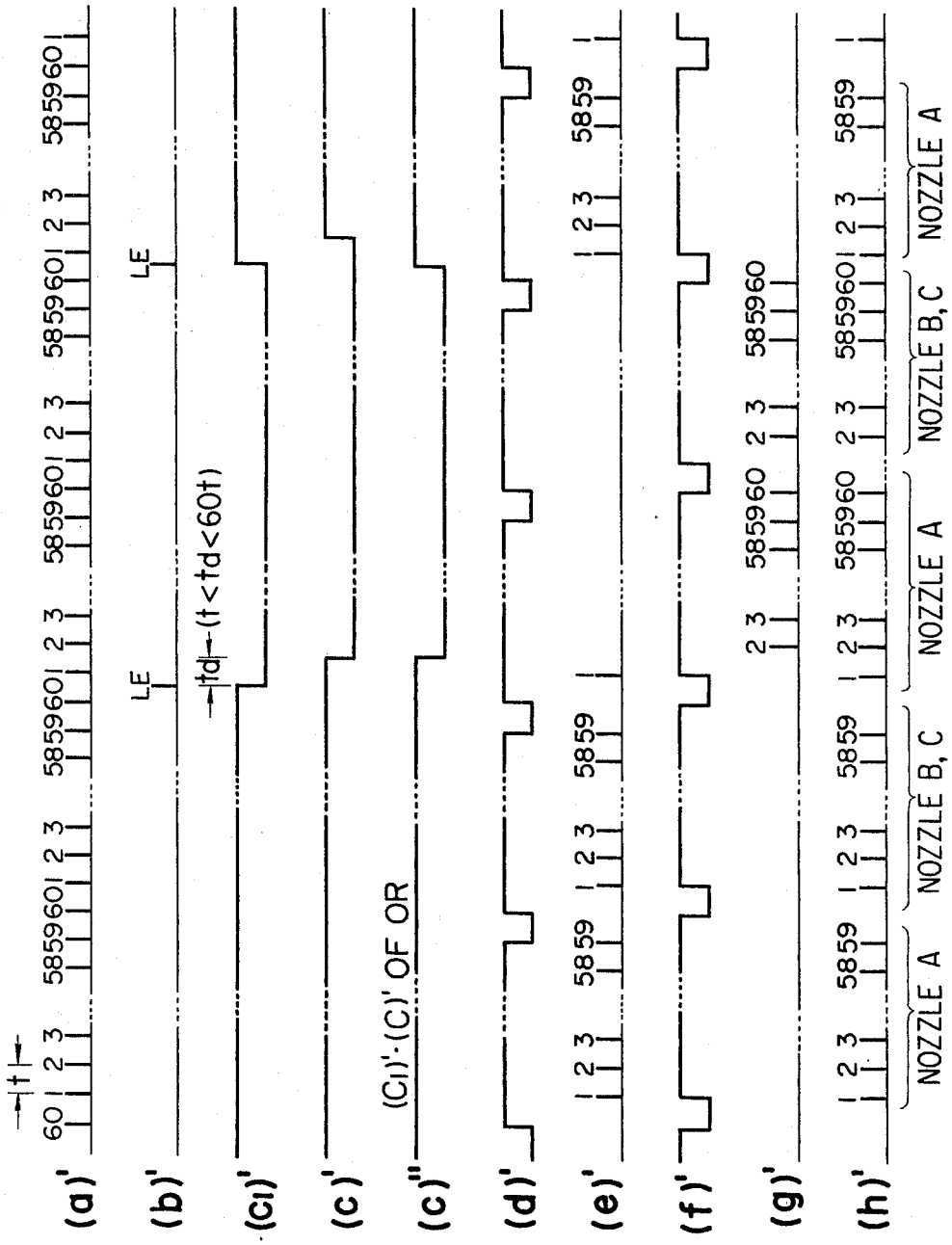

Referring to FIGS. 4 and 6, the first clock pulses A or (a)' are applied to the modulo-60 counter 2 so that not only the signal (d)' but also the signal (f)' are derived.

The signal (d)' falls in response to the 59-th first clock pulse A and rises in response to the 60-th clock pulse A while the signal (f)' falls at the 60-th clock pulse A and rises in response to the next or first clock pulse A. The "line-end" signal (b)' or LE is applied to the binary counter 19, and the output (c)' from the counter 19 is delayed by the time-dealy circuit 23 by a time $t_d$ (which is longer than one interval T of the clock pulse A but shorter than 60 intervals T of the clock pulse A). The OR of the output (c)' from the time-delay circuit 23 with the output $(c_1)'$ from the binary counter 19 is obtained from the OR gate 24. The OR output (c), the output (d)' from the modulo-60 counter 2 and the first clock pulses (a)' are applied to the AND gate 17. Then only when the output (c)" from the OR gate 24 is at a high level H, the clock pulse train (e)' in which the 60n-th pulses are suppressed may be derived.

The output (c)" of the OR gate 24 is also applied through the inverter 20 to the AND gate 18 to which are also applied the outputs (a)' and (f)'. Then only when the output from the OR gate 24 is at a low level, the clock pulse train (g)' having the (60n+1)-th pulse supressed may be derived. The pulse trains (e)' and (g)' are applied to the OR gate 21 so that the pulse train (h)' may be derived in which the pulse trains or series (e)' and (g)' alternate whenever one line is fed that is, whenever the output from the binary counter 19 changes from the high level to the low level and from the low level to the high level. The pulse train (h)' is fed to the one-line memory 11 so that in response to each pulse, the contents of the one-line memory 11 is output to the latching circuit 13. The succeeding operations are similar to those of the first embodiment.

Therefore in response to the state of the binary counter 19, the nozzles A, B, C and so on print the ink dots as follows:

| Line | Binary counter 19 | Nozzle A | Nozzle B | Nozzle C | ... |
|---|---|---|---|---|---|
| 1 | L | 60 dots | 59 dots | 59 dots | --- |
| 2 | H | 59 dots | 59 dots | 59 dots | --- |
| 3 | L | 60 dots | 59 dots | 59 dots | --- |
| 4 | H | 59 dots | 59 dots | 59 dots | --- |
| 5 | L | 60 dots | 59 dots | 59 dots | --- |
| . | . | . | . | . | ... |

Since the suppressed pulses are displaced by one pulse from one line to another so that the ink dot arrays as shown in FIG. 2 may be printed.

Figure 7:
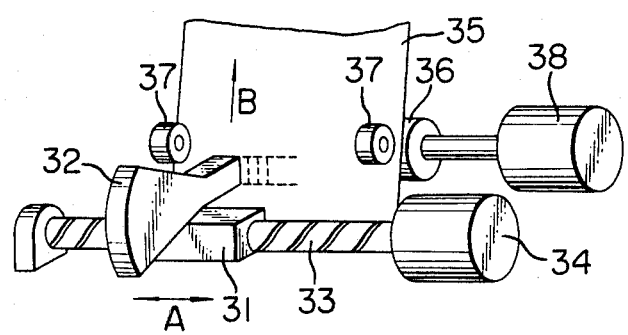
FIG. 7 is a schematic perspective view of an ink-jet plotter embodying the present invention.

In FIG. 7 is shown an ink-jet plotter embodying the present invention. The ink-jet plotter comprises in general a carriage 31, a print head 32, a lead screw 33 drivingly engaged with the carriage 31 and a head-feed motor 34 which is reversible and drivingly coupled to the lead screw 33. When the motor 34 is driven in one direction or the other direction, the print head 32 is fed in either directions indicated by the double-pointed arrow A. The print head 32 may be of the on-demand type having 10 to 30 nozzles, the binary or nozzle-per-spot type having 10 to 30 nozzles or the single nozzle type in which the charge on the drop may be varied depending upon the deflection angle.

Figure 8:
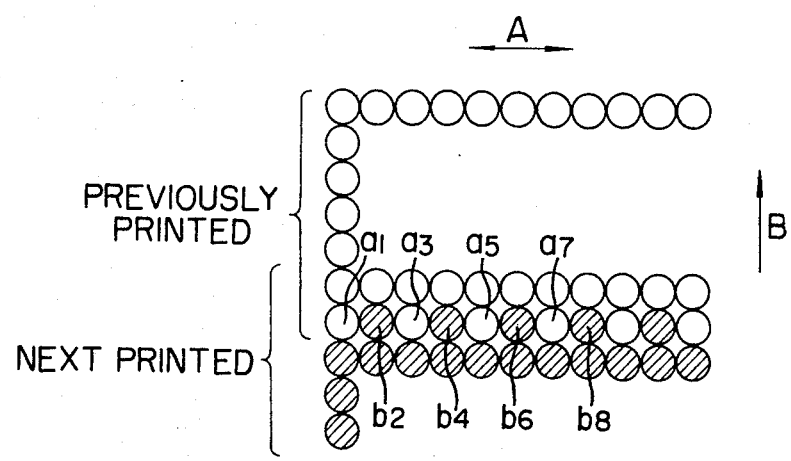
FIG. 8 shows the ink dot placement for rendering less noticeable a blank row or a black line segment.

The ink-jet plotter further includes a recording medium transport system comprising a recording medium 35, a platen 36, paper bail rolls 37 and a motor 38 drivingly coupled to the platen 36 so that whenever the print head 32 reaches the rightmost or leftmost end of the ink-dot printing line, the recording medium may be fed by one dot line in the direction indicated by the arrow B. However, because of hunting and/or erratic detections of the position of the recording medium 35, the latter cannot be fed by a correct distance. As a result, the lowermost row of the previously printed ink dot array cannot be spaced apart from the uppermost row of the next printed ink dot array by a correct distance so that a blank row or black line segment appears as described elsewhere. In order to overcome the above problem, according to the present invention, in the boundary row; that is, the lowermost row of the previously printed ink dot array and the uppermost row of the next printed ink dot array, the ink dots $a_1$, $a_3$, $a_5$, $a_7$ and so on printed by the previous printing cycle are interlaced with the ink dots $b_2$, $b_4$, $b_6$, $b_8$ and so on printed by the next printing cycle as shown in FIG. 8. Then, as with the first and second embodiments, the boundaries between the adjacent ink dot arrays may be made less noticeable.

Figure 9:
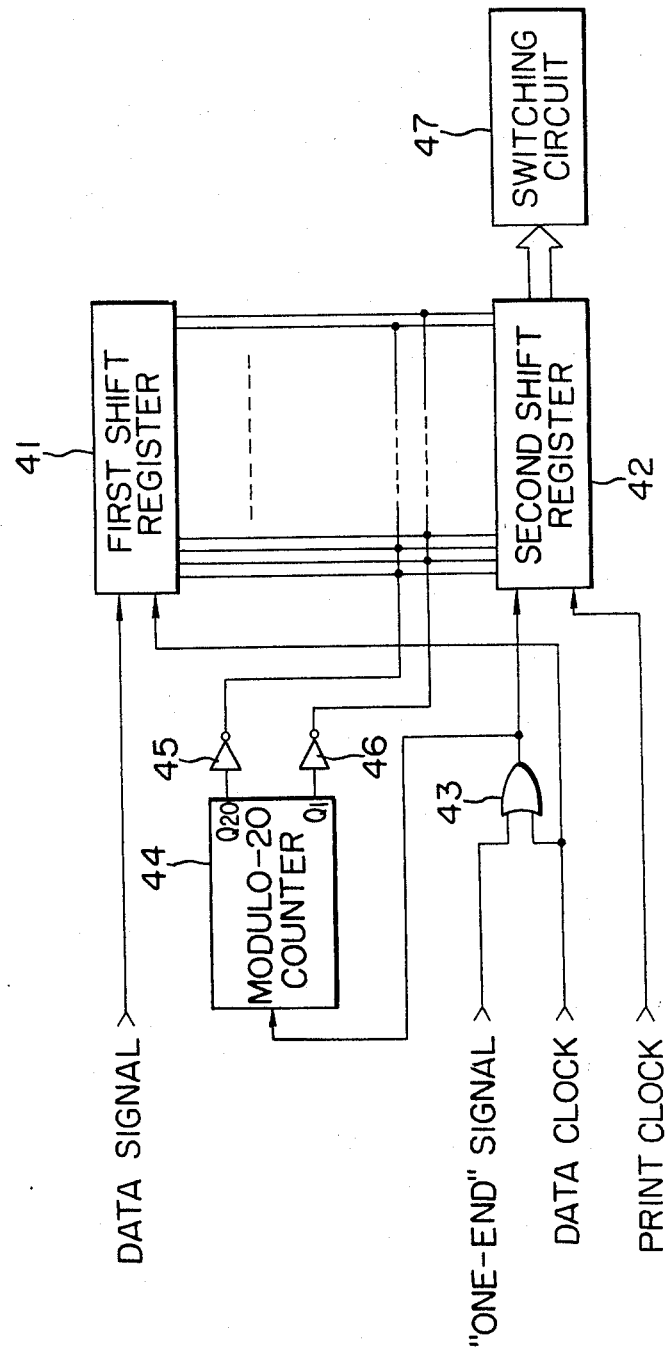
FIG. 9 is a diagram of a control circuit of a third embodiment of the present invention for effecting to interlace ink dot printing as shown in FIG. 8 in the boundary row into which are overlapped the lowermost row of the ink dot array printed previously and the uppermost row of the ink dot array printed next.

In FIG. 9 is shown a third embodiment of the present invention capable of the interlace dot printing in the boundary rows between the adjacent dot arrays as described above with reference to FIG. 8. It is assumed that one print head may print 20 dots simultaneously in the horizontal direction. (or in the vertical direction.)

Referring to FIG. 9, the data signal for one ink dot printing line (that is, one row in FIG. 8) is stored in one-line shift register 41, and in response to the data clock the contents in the shift register 41 are transferred and stored in a shift register 20 capable of storing the data signal for 20 lines. The data clock is also applied through an OR gate 43 to a modulo-20 counter 44. The $Q_1$ output of the counter 44 rises to a high level for every $(20n+1)$-th data clocks (where n is an integer) and is applied through an inverter 46 to the even-numbered transmission lines between the first and second shift register 41 and 42 so that the even-numbered ink dots may not be printed. The $Q_{20}$ output from the counter 44 rises to a high level for every 20n data clocks and are applied to the odd-numbered transmission lines so that the odd-numbered ink dots may not be printed.

When the second shift register 42 receives the data signal for 20 lines, the print clock is generated so that the carriage (not shown) is moved and the output signal is generated by the second shift register for every 20 ink dot printing signals and applied to a switching circuit 47. In response to the output signal from the switching circuit 47, the ink dots are printed.

In response to the "line-end" signal, the contents in the first shift register remains unchanged but the ink dot printing signals which have not been transferred into the second shift register 42 in the previous printing cycle are now transferred to the second shift register 42 so that the ink dots may be printed. As a result, ink dots are printed as shown in FIG. 8 so that the boundaries between the ink dot arrays may be made less noticeable and consequently the image quality may be considerably improved.

It is to be understood that the present invention is not limited to the embodiments described above, but it may be equally applied to other types of ink-jet printers or plotters. For instance, the present invention may be applied to an ink-jet printer or plotter of the type wherein a recording medium is wrapped around a rotary drum and a print head carriage is axially reciprocated once while the rotary drum rotates a predetermined number of turns. In this case, it is apparent to those skilled art that instead of the "line-end" signal, the signal representative of one rotation of the rotary drum may be applied. Furthermore the control circuit shown in FIG. 3 or FIG. 4 may be also applied to the ink-jet printer or plotter of the type having a plurality of nozzles and wherein the lead screw-and-nut type carriage transport system is employed.

Figure 10:
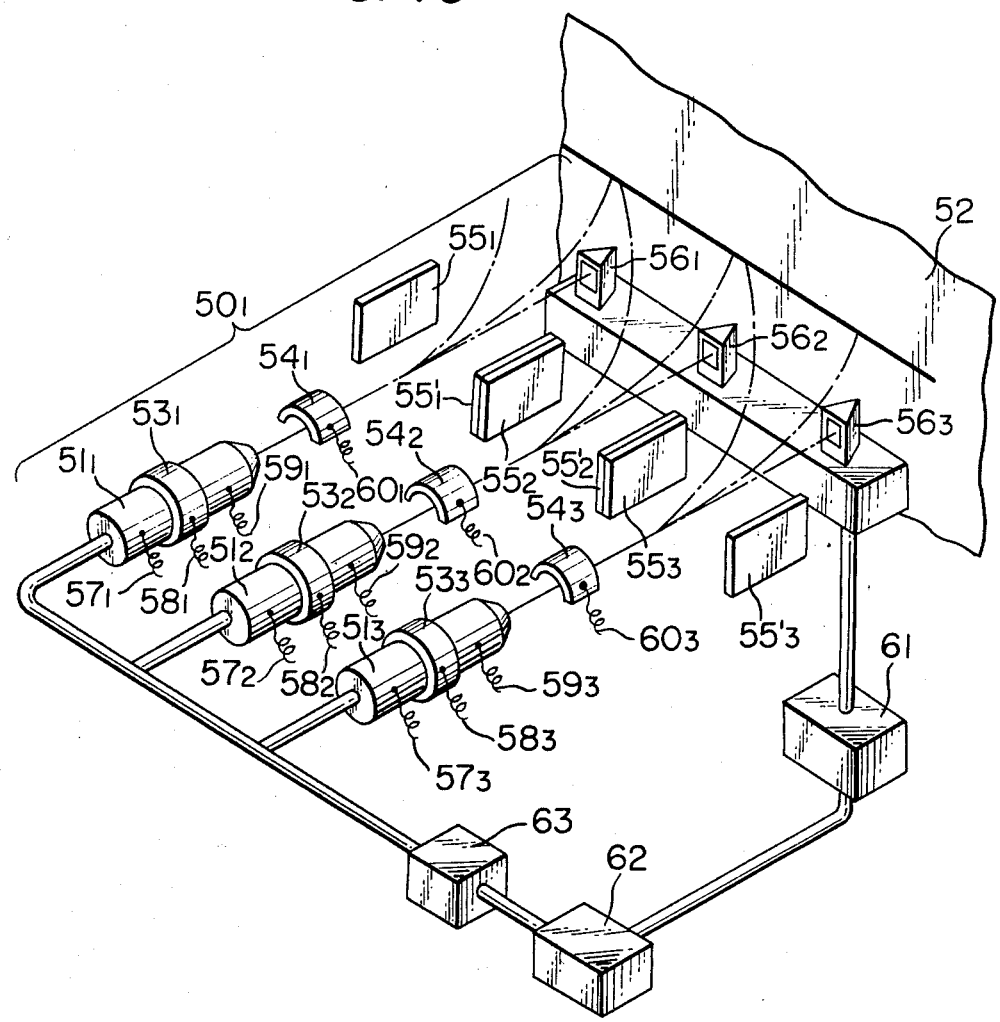
FIG. 10 is a perspective view of an ink-jet plotter embodying the present invention.

In FIG. 10 is shown a fourth embodiment of the present invention having an array of 60 print head units $50_1$ through $50_{60}$ arranged in the direction of transport of a recording medium 52. Each ink-jet print head unit $50_1$ comprises in general an ink manifold 51 with a nozzle, an electromechanical transducer 53 such as piezoelectric transducer mounted on the ink manifold 51, a charge electrode 54, a pair of deflection electrodes 55 and a gutter 56. As is well known in the art, the exciting or synchronizing pulses are applied between the terminal 57 connected to the ink manifold 51 and the terminal 58 connected to the transducer 53 so that the continuous jet of ink may be issued from the nozzle and break up into drops. The charge signal is applied across the terminals 59 and 60 so that a charge may be imparted to each ink drop at the instant when the ink jet breaks up into drops, the charge on each drop being varied in response to the ink dot placement signal so that the charged ink drop may be deflected by a predetermined angle when passing through the deflection electrodes 55. For instance, each print head unit $50_1$ may place an ink drop at any of 60 discrete points along the line of 5 mm, whereby any desired characters, symbols and patterns may be drawn. The unused ink drops are not charged, trapped by gutter 56 and recirculated through an ink recirculation system comprising an ink reservoir 61, a pump 62 and a filter 63 from which the recovered ink is distributed to the print head units $50_1$ through $50_{60}$.

With the multiple-ink-jet printer or plotter of the type described with reference to FIG. 10, the problem of blank columns or black line segments also arises as described elsewhere with reference to FIG. 1. In addition to the causes described elsewhere, this problem is caused by the aging of the ink used and the variations in input voltage to the ink-jet printer or plotter even when the print heads are adjusted correctly.

Figure 11:
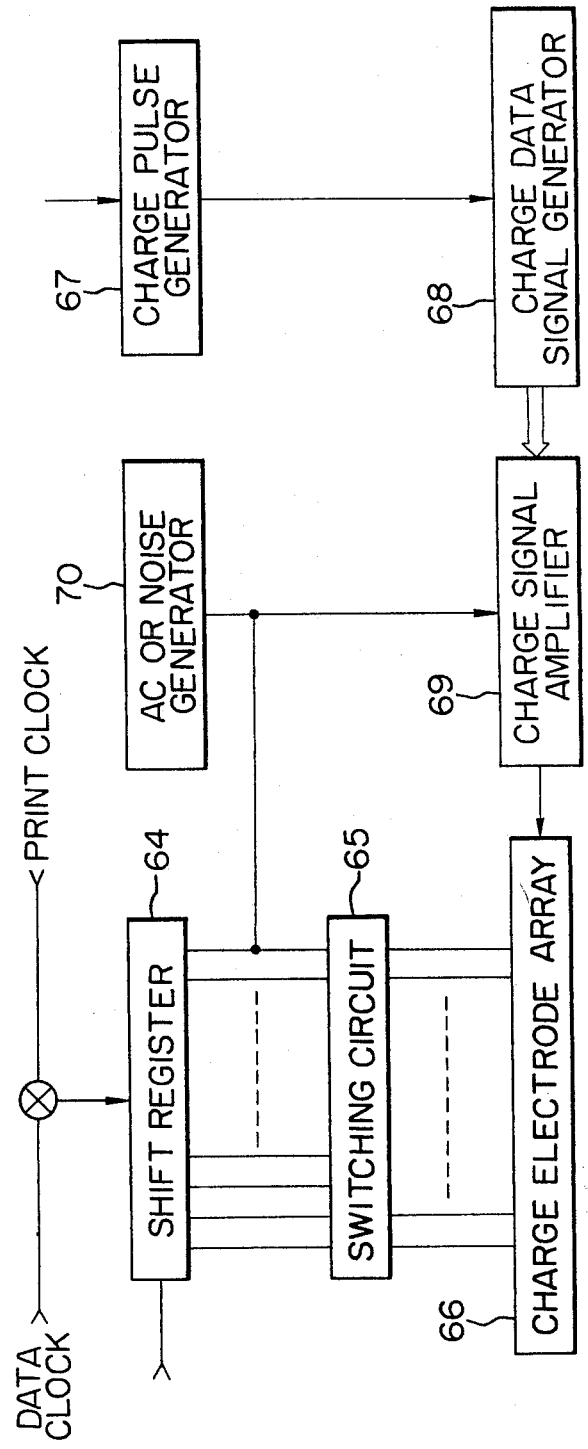
FIG. 11 is a block diagram of a control circuit of a fourth embodiment of the present invention.

In the fourth embodiment of the present invention, in order to overcome the above problem, a control circuit shown in FIG. 11 is used. The ink dot print data is transferred and stored in a shift register 64 in response to the data clock, and in response to the print clock the contents in the shift register 64 are transferred into a switching circuit 65 in such a way that only high-level outputs (that is, the ink dot print signals) from the shift register 64 may be transmitted through the switching circuit 65 to corresponding charge electrodes 54 in a charge electrode array 66, whereby only the ink drops that are used or printed may be charged.

Figure 12:
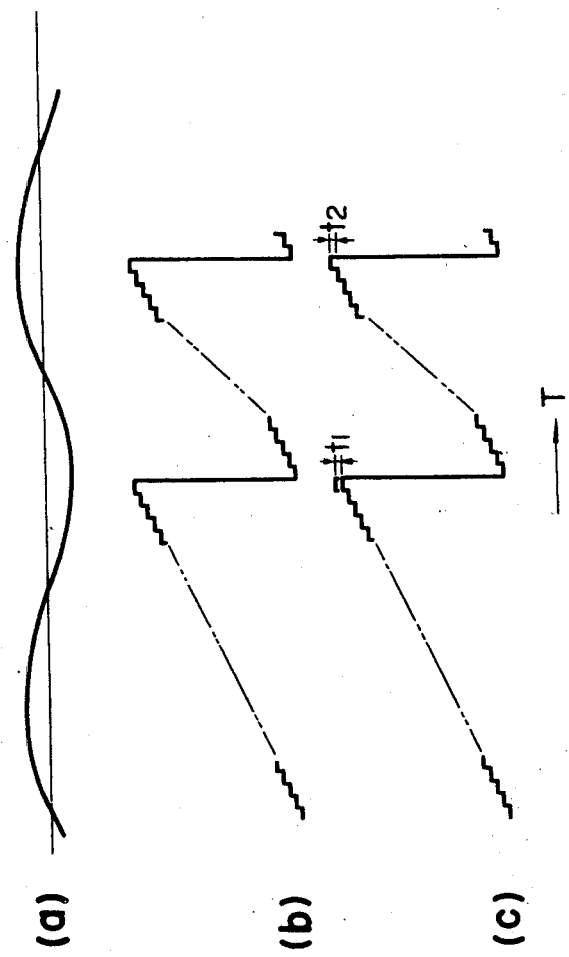
FIG. 12 shows the waveforms of the signals present in the control circuit in FIG. 11 used for the explanation of the mode of operation thereof.

A detection electrode (not shown) which is incorporated in each print head 50 detects an optimum phase for charging an ink drop to be used, and in response to the output from the detection electrode, a charge pulse generator 67 is controlled to determine a timing for charging an ink drop. A charge data signal generator 68 generates the charge signal having 60 steps and the charge signal is subjected to the digital-to-analog conversion by a charge signal amplifier 69, whereby the step-wave signal as shown in FIG. 12(b) may be derived so as to charge an ink drop. The above described ink-jet printing process is well known in the art, but as described elsewhere such ink-jet printing process inevitably results in blank columns or black line segments.

In order to overcome this problem, the present invention further provides an AC or noise generator 70 which generates the output as shown in FIG. 12(a). This output is combined only with the charging voltage applied to the charge electrode 54 for charging the 60-th ink drop; that is, the ink drop placed at the outermost position. More particularly, by so doing, as shown in FIG. 12(c), the voltage applied to the ink drop which is to be placed at the outermost position is raised or lowered for a time interval $t_1$ or $t_2$. Then the charged ink drop may land at a position initially displaced from a normal position. As a result, even though resolution is somewhat degraded, the boundaries between the ink dot arrays printed by the adjacent print heads 50 may be free from a blank column or black line segment, whereby the image quality may be remarkably improved.

So far the landing position of the outermost ink drop has been described as being displaced slightly from a normal position by superposing the AC or noise signal from the AC or noise generator 70 on the charging voltage, but it is to be understood that the same effect may be also attained by slightly changing the voltage applied across the deflection electrodes when the outermost ink drop is passing therethrough. Alternatively, an additional transducer may be mounted on the ink manifold 51 and energized when the ink drop destined to the outermost position is to be issued, thereby varying the pressure applied to the ink in the ink manifold 51.

Figure 13:
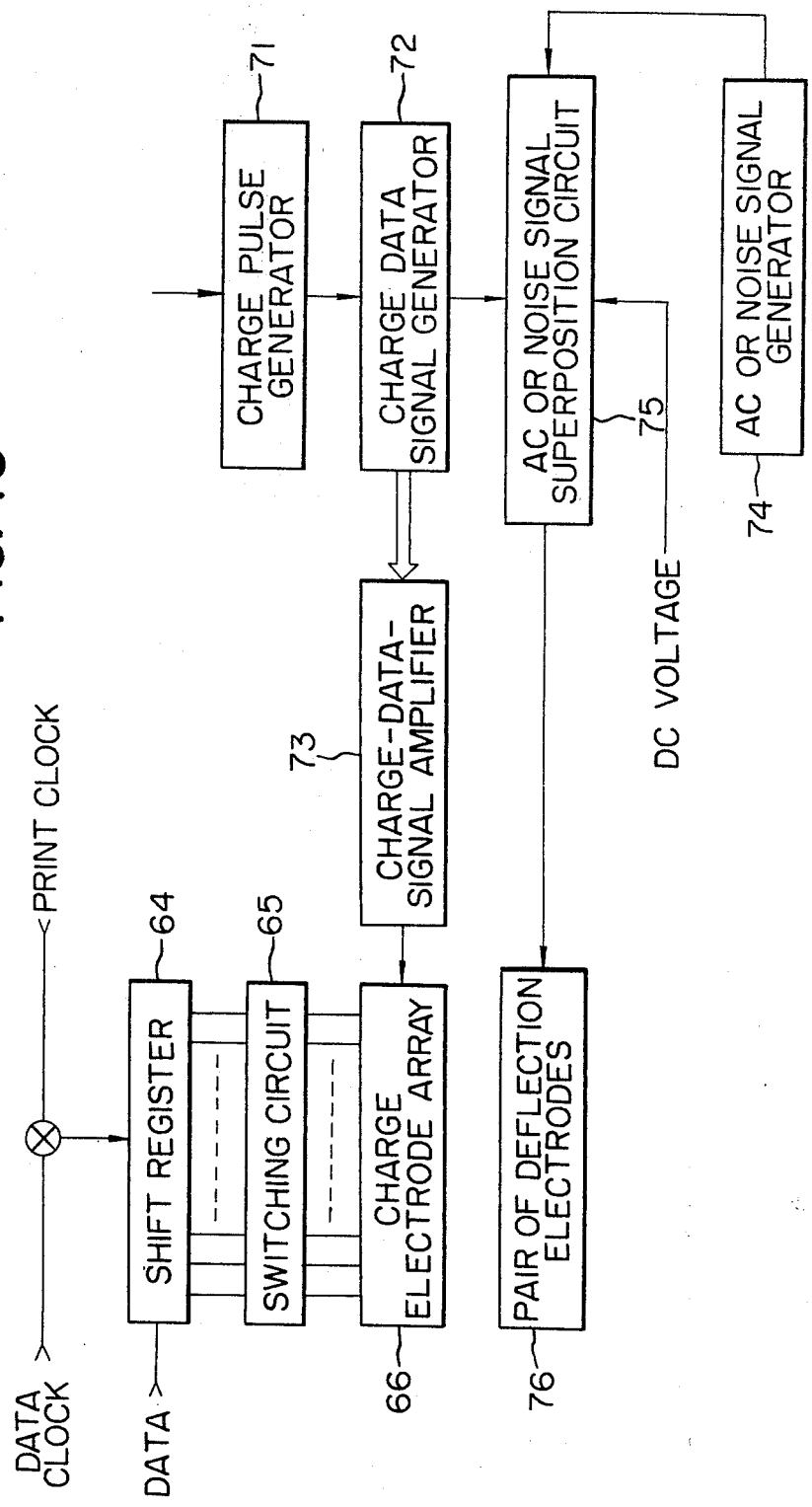
FIG. 13 is a block diagram of a control circuit of a fifth embodiment of the present invention.

In FIG. 13 is shown a fifth embodiment of the present invention comprising a shift register 64, a switching circuit 65, a charge electrode array, a charge pulse generator 71, a charge data signal generator 72, a charge-data-signal amplifier 73, an AC or noise signal generator 74, an AC or noise signal superposition circuit 75 and a pair of deflection electrodes 76.

In operation, the print data is stored in the shift register 64 in response to the data clock, and in response to the print clock, the contents in the shift register 64 are transferred to the switching circuit 65 in such a way that the high-level outputs; that is, the print signal may be applied to the corresponding charge electrodes in the charge electrode array 66 so that the ink drops to be used may be charged. As with the fourth embodiment, a detection electrode (not shown) is used for detecting an optimum phase at which each ink drop is charged. The output from the detection electrode is applied to the charge pulse generator 71 so that an optimum timing for charging the ink drop may be determined charge data signal generator 72 generates 60 stepped charge data signals which undergo the digital-to-analog conversion in the amplifier 73 so that the step-wave signals as shown in FIG. 14(a) may be derived. The ink-jet printing process described above is well known in the art and unavoidably leaves the blank columns and/or black line segments as described elsewhere.

Figure 14:
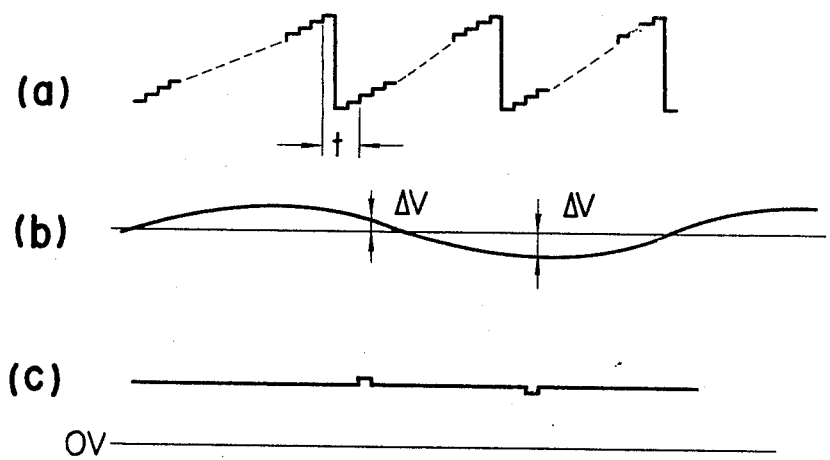
FIG. 14 shows the waveforms of the signals present in the control circuit shown in FIG. 13 used for the explanation of the mode of operation thereof.

To overcome this problem, the present invention provides the AC or noise signal generator 74, as with the fourth embodiment. The AC or noise signal $\Delta V$ from the generator 74 as shown in FIG. 14(b) is applied to the superposition circuit 75 so that when the ink drop destined to be placed at the outermost position is passing at the center of the deflection electrodes 76, the AC or noise signal $\Delta V$ is superposed on the deflection voltage for a time t as shown in FIG. 14, thereby varying the deflection voltage as shown in FIG. 14(c). Then the ink drop lands at a position displaced slightly from a normal dot position as with the fourth embodiment. As a consequence, even though resolution is degraded to some extent, the blank columns or black line segments may be made less noticeable, whereby the image quality may be considerably improved.

Instead of applying the AC or noise signal to the deflection electrodes 76, it may be applied to the electromechanical transducer as will be described below.

Figure 16:
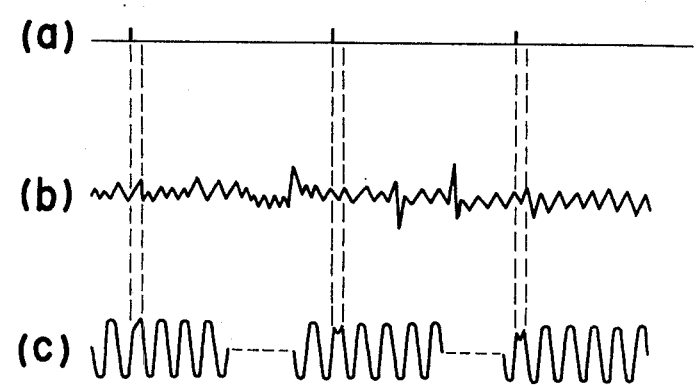
FIG. 16 shows the time relationships between the signals present in the control circuit shown in FIG. 15 used for the explanation of the mode of operation thereof.
Figure 15:
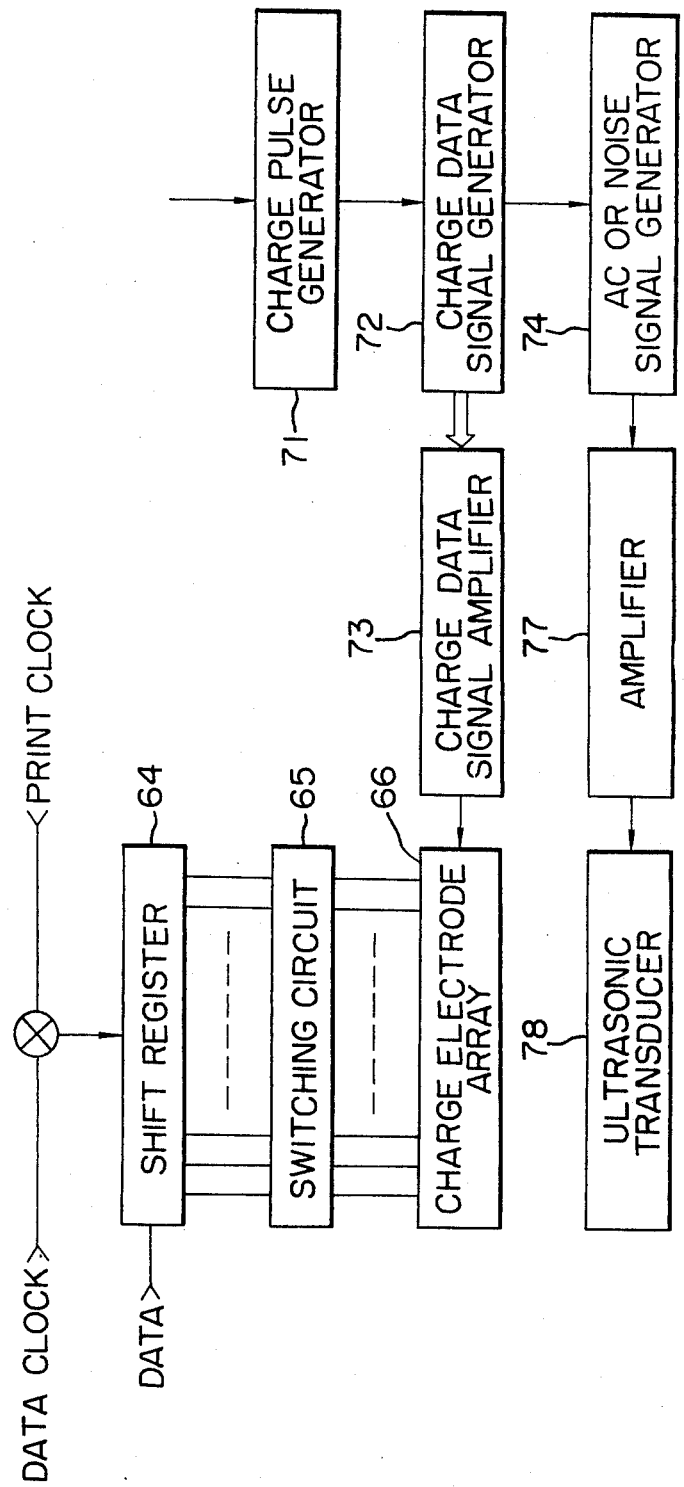
FIG. 15 is a block diagram of a control circuit of a sixth embodiment of the present invention.

Referring to FIG. 15, the AC or noise signal from the AC or noise signal generator 74 is superposed on the output from the charge data signal generator 72 and amplified by an amplifier 77 so as to drive an ultrasonic transducer 78 which is mounted on an ink manifold. More particularly, in response to the signal shown in FIG. 16(a) and representative of the instant when the continuous jet of ink issuing from the nozzle of the ink manifold forms an ink drop which is to be placed to the outermost position, the AC or noise signal as shown in FIG. 16(b) is superposed on the synchronizing signal or voltage applied to the ultrasonic transducer 78 as shown in FIG. 16(c) so that the pressure applied to the ink in the ink manifold may be varied in phase or magnitude and consequently the ink drop may be varied in size, velocity and spacing. As a result, the trajectory of this ink drop may be slightly varied from a normal trajectory so that the ink drop may be placed at a position slightly displaced from a normal position. Thus, even though resolution may be degraded to some extent, the blank columns and black line segments may be made less noticeable, whereby the overall image quality may be remarkably improved.

So far the process for eliminating the blank columns and black line segments has been described in detail in conjunction with the electrostatic deflection type ink-jet plotter, but it is appreciated that the present invention may be equally applied to the on-demand type ink-jet print head having 10 to 30 nozzles though each of which the ink under pressure is issued on demand or the electrostatic deflection type ink-jet print head which is carried on a carriage which sweeps the print head across the width of a recording medium and has a single ink-issuing nozzle, the charge on the ink drop being varied depending upon a desired deflection.

What is claimed is:

1. An ink-jet printer comprising:
    an ink-jet print head having a plurality of nozzles arranged for printing dots in a coordinate array of rows and columns, each nozzle having an ink drop charging electrode and a pair of ink drop deflection electrodes;
    means for providing relative motion between said head and a recording medium to cause said head to scan said medium in horizontal and vertical directions to print a pattern comprising groups of adjacent dot arrays, each dot array comprising a plurality of dots, with one dot array corresponding to each nozzle of said print head, the boundaries between adjacent dot arrays being defined by a first outermost line of dots of one dot array and an oppositely disposed parallel second line of dots of another dot array;
    digital control means for sequentially enabling said nozzles to print said dot arrays; and
    stagger circuit control means operatively associated with said digital control means for varying the positions of selected portions of said first and second lines of dots to cause only some dots of the first line to be deflected toward the second line, and only some dots of the second line to be deflected toward other dots of the first line, while enabling said digital control means to generate only the dots of said lines which are so deflected.

2. The printer according to claim 1, wherein said first and second lines of dots are interlaced with each other to form a composite boundary line between adjacent dot arrays.

3. The printer according to claim 1, wherein said stagger circuit control means comprises means for superimposing an AC or noise voltage on a control voltage applied to the charging electrodes of the nozzles for generating said first and second lines.

4. The printer according to claim 1, wherein said stagger circuit control means comprises means for superimposing an AC or noise voltage on a control voltage applied to the deflection electrodes of the nozzles for generating said first and second lines.

5. The printer according to claim 1, wherein said stagger circuit means comprises dither means for randomly varying the positions of said selected portions of said first and second lines of dots.

6. The printer according to claim 1, further comprising an ink manifold, an electro-mechanical transducer mounted on said manifold for imparting pressure to said ink drops, and means for applying a synchronizing voltage to said transducer when an ink drop is generated for forming a dot of said first or second line, wherein said stagger circuit control means comprises mans for varying the phase or amplitude of said synchronizing voltage.

* * * * *